United States Patent [19]

Imajo et al.

[11] Patent Number: 4,839,831
[45] Date of Patent: Jun. 13, 1989

[54] OIL DEGRADATION WARNING SYSTEM

[75] Inventors: Minoru Imajo, Yokohama; Tsunehiro Kawakita, Yokosuka, both of Japan

[73] Assignee: Nissan Motor Co., Ltd., Yokohama, Japan

[21] Appl. No.: 838,619

[22] Filed: Mar. 11, 1986

[30] Foreign Application Priority Data

Mar. 12, 1985 [JP] Japan .................................. 60-48795

[51] Int. Cl.$^4$ ............................................. G01D 21/00
[52] U.S. Cl. ........................................ 364/550; 73/64; 73/117.3; 123/196 S
[58] Field of Search ................................ 364/550–552; 123/196 R, 196 S; 184/1.5, 6.5–6.8; 60/605 B, 599, 611; 73/64, 117.3

[56] References Cited

U.S. PATENT DOCUMENTS

| | | | |
|---|---|---|---|
| 4,007,629 | 2/1977 | Hochstein | 73/64 |
| 4,306,525 | 12/1981 | Faxvog | 123/196 S |
| 4,497,200 | 2/1985 | Tournier | 73/64 |
| 4,506,337 | 3/1985 | Yasuhara | 364/551 |
| 4,677,847 | 7/1987 | Sawatari et al. | 73/117.3 |

FOREIGN PATENT DOCUMENTS

| | | | |
|---|---|---|---|
| 0191458 | 8/1986 | European Pat. Off. | 123/196 S |
| 0162320 | 9/1984 | Japan | 60/605 B |

*Primary Examiner*—Parshotam S. Lall
*Attorney, Agent, or Firm*—Foley & Lardner, Schwartz, Jeffery, Schwaab, Mack, Blumenthal & Evans

[57] ABSTRACT

Herein disclosed is an oil degradation warning system for an engine equipped with a turbocharger. The system comprises first means for detecting the temperature of the engine oil in the turbocharger, second means for deriving a correction coefficient from informations issued from the first means; third means for multiplying a predetermined time increment by the correction coefficient to derive a modified time increment; fourth means for integrating the modified time increment to derive a time dependent oil degradation value; and fifth means for issuing a warning when the time dependent oil degradation value becomes equal to or larger than a predetermined value.

6 Claims, 3 Drawing Sheets

OIL DEGRADATION WARNING SYSTEM

BACKGROUND OF THE INVENTION

1. Field of the Invention

The present invention relates in general to a warning system for a motor vehicle, and more particularly to a so-called 'engine oil degradation warning system' which automatically gives a visual or audible warning when the engine oil has been degraded to a certain unusable degree.

2. Description of the Prior Art

As is known, engine oil functions not only to lubricate movable metal parts, such as pistons or the like, but also to remove heat from heated parts of the engine. However, usage of the engine oil degrades the nature thereof gradually with passage of time, and finally the engine oil degrades to an unusable degree.

In view of the above, various kinds of oil degradation warning systems have been hitherto proposed and put into practical use. Some are of a type in which, as is disclosed in Japanese Patent First Provisional Publication No. Sho. 57-151447, the oil change time (viz., the time when a warning for need of oil change is issued) is calculated based on the time for which the engine oil has been 'practically' used in the engine That is, in such conventional systems, the time for which the engine has practically operated is integrated and when the integrated value of the time exceeds a predetermined value, the oil change warning is issued for letting a person know the need of oil change.

However, as is known, the degradation of the oil advances naturally with passage of time even when the engine is under a stand still. The advance of oil degradation is most severe when, like just after the engine stops, the oil temperature is still high, and when, in cold weather, the oil is contaminated with water. Thus, some of the conventional warning systems of the above-mentioned type have suffered from the drawback that the oil change warning is displayed considerably after the date on which an the oil change is really needed.

This undesirable phenomenon is much more severe when the engine is equipped with a turbocharger. That is, since the turbocharger is heated so much during operation of the engine, the high temperature of the same is kept long even after stopping of the engine operation. This causes the remarkable degradation of the oil. Thus, when high load operations are frequently carried out in the turbocharger-mounted engine during its use, the time for issuing the oil change warning is greatly delayed, inducing lubrication problems of the engine and the turbocharger.

SUMMARY OF THE INVENTION

It is therefore an essential object of the present invention to provide an improved oil degradation warning system which is free of the above-mentioned drawbacks.

According to the present invention, there is provided an oil degradation warning system which can issue a warning at the time when the oil change is really needed.

According to the present invention, there is provided an oil degradation warning system for an engine equipped with a turbocharger. The system comprises first means for detecting the temperature of the engine oil in the turbocharger, second means for deriving a correction coefficient from informations issued from the first means, third means for multiplying a predetermined time increment by the correction coefficient to derive a modified time increment, fourth means for integrating the modified time increment to derive a time dependent oil degradation value, and fifth means for issuing a warning when the time dependent oil degradation value becomes equal to or larger than a predetermined value.

BRIEF DESCRIPTION OF THE DRAWINGS

Other objects and advantages of the present invention will become apparent from the following description when taken in conjunction with the accompanying drawings, in which.

DESCRIPTION OF THE INVENTION

In the following, an embodiment of the present invention will be described with reference to the drawings.

Figure 1:
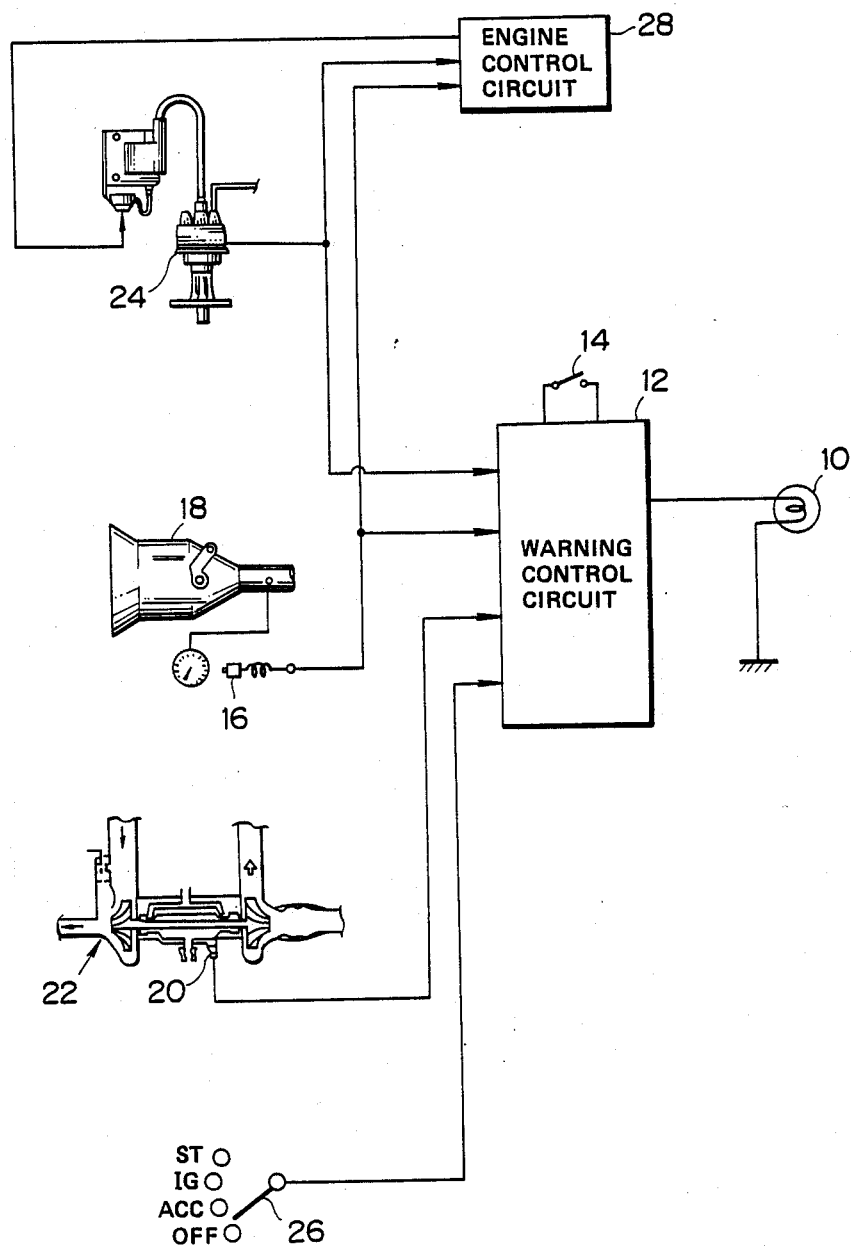
FIG. 1 is a block diagram of the oil degradation warning system of the present invention.

Referring to FIG. 1, there is shown a block diagram of the oil degradation warning system, in which a warning lamp 10 is energized or lighted when the oil change is really needed. The lamp 10 is controlled by a warning control circuit is connected thereto.

In the warning control circuit 12, the value representative of moved distance traveled by the associated vehicle and the value representative of the time elapsed from the time a previous oil change was carried out are both integrated with passage of time, and when at least one of the integrated values reaches a predetermined degree, the warning control circuit 12 issues a signal to energize the warning lamp 10. Due to operation of a reset switch 14, the system is initialized when the oil change is actually carried out.

The moved distance is estimated by integrating the vehicle speed which is sensed by a vehicle speed sensor 16. In the disclosed embodiment, the speed sensor 16 is of a type which measures the revolution of an output shaft of a transmission 18.

In order to make correction to the integrated values of the moved distance and the elapsed time in view of the oil temperature, the engine oil temperature is measured by an oil temperature sensor 20 mounted to a turbocharger 22. Preferably, the temperature sensor 20 is so set as to detect the temperature of the oil which flows along the turbocharger shaft, as shown in FIG. 1.

In addition to the above, correction to the value of the distance moved is also dependent on engine speed, which is measured by a crankangle sensor 24 mounted in a distributor. Operation of an ignition switch 26 is monitored by the warning control circuit 12, and the various treatments effected by the control circuit 12 are made in accordance with the positions which the ignition switch assumes.

Designated by numeral 28 is an engine control circuit which controls the ignition timing and the amount of fuel supplied to or injected into each combustion chamber in accordance with the information signals issued from the vehicle speed sensor 16, the crankangle sensor 24 and the other sensors (not shown).

In the following operation of the oil degradation warning system of the invention will be described with reference to the flowcharts of FIGS. 2, to 4.

Figure 2:
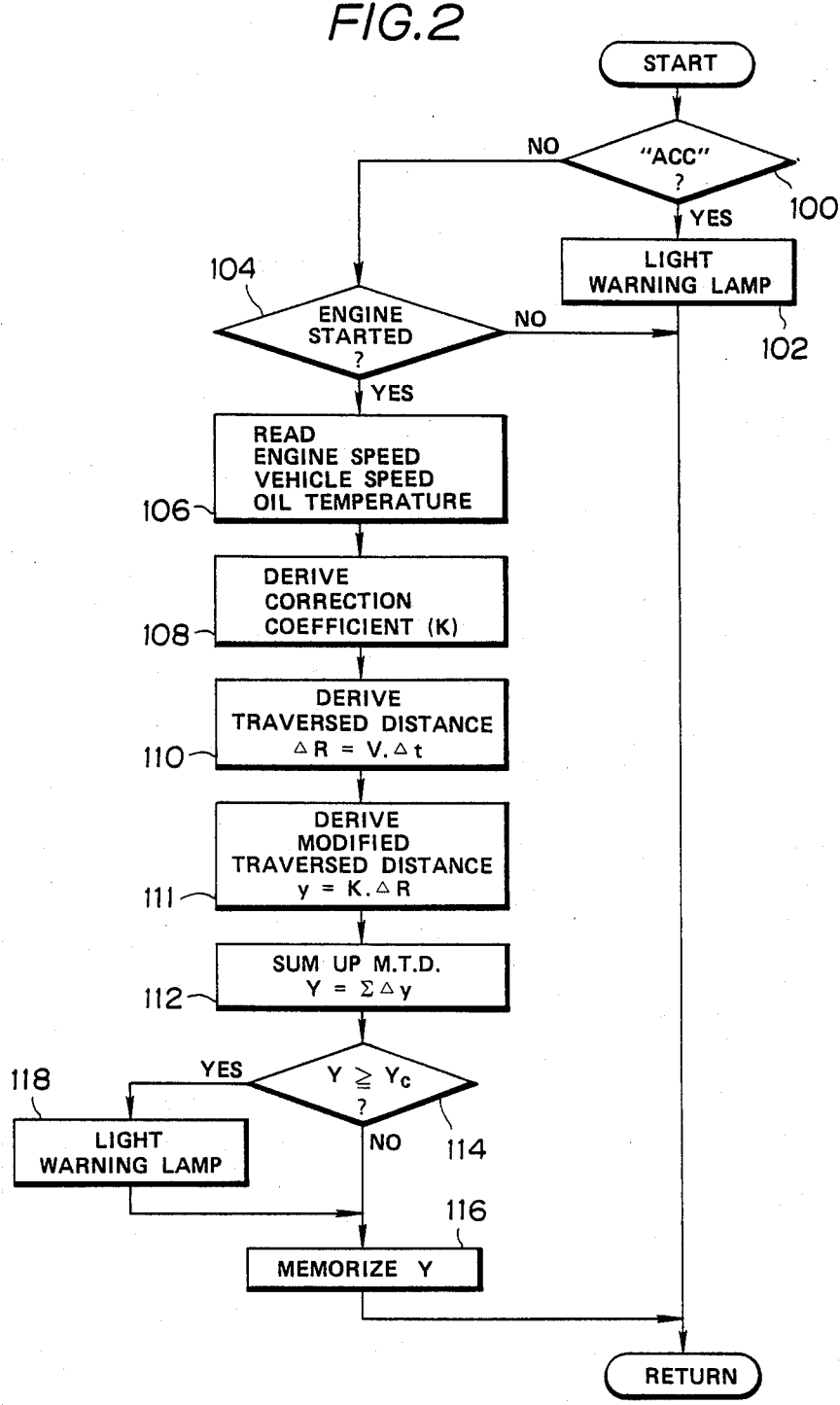
FIGS. 2 to 4 are flowcharts showing programs executed by the warning system of the invention.

As will be seen from the flowchart of FIG. 2, when, upon engine start, the ignition switch 26 comes to 'ACC' (accessory) position, this turning is recognized at step 100 and energizes the warning lamp 10 (step 102) for checking the same.

When, due to turning of the switch 26 to 'ST' (start) position and to 'IG' (ignition) position, the engine start is recognized at step 104, information signals from the vehicle speed sensor 16, the oil temperature sensor 20 and the crankangle sensor 24 are read at step 106.

At step 108, a correction coefficient 'K' for the value of the traversed distance is derived from the values of the engine speed and the engine oil temperature. At step 110, the detected value of vehicle speed 'V' is multiplied by a predetermined time increment '$\Delta t$' to derive a traversed distance $\Delta R$. Then, at step 111, the value '$\Delta R$' is multiplied by the correction coefficient 'K' to derive a modified traversed distance 'y' which is stored.

The value 'y' the modified traversed distance is, at step 112, integrated or summed up to derive a distance dependent oil degradation value 'Y'. At step 114, the value 'Y' is compared with a predetermined value '$Y_c$' which represents the need of oil change.

When the value 'Y' is still smaller than the value '$Y_c$', the value 'Y' is memorized at step 116. These steps are repeated during operation of the engine until the updated value 'y' is matured to the predetermined value '$Y_c$'.

When the updated value 'Y' becomes equal to or larger than the predetermined value '$Y_c$', the warning lamp 10 is energized for letting a person or driver know the need of oil change, at step 118.

The following steps are also carried out for issuing the oil change warning, based on the oil degradation which advances naturally with passage of time.

Figure 3:
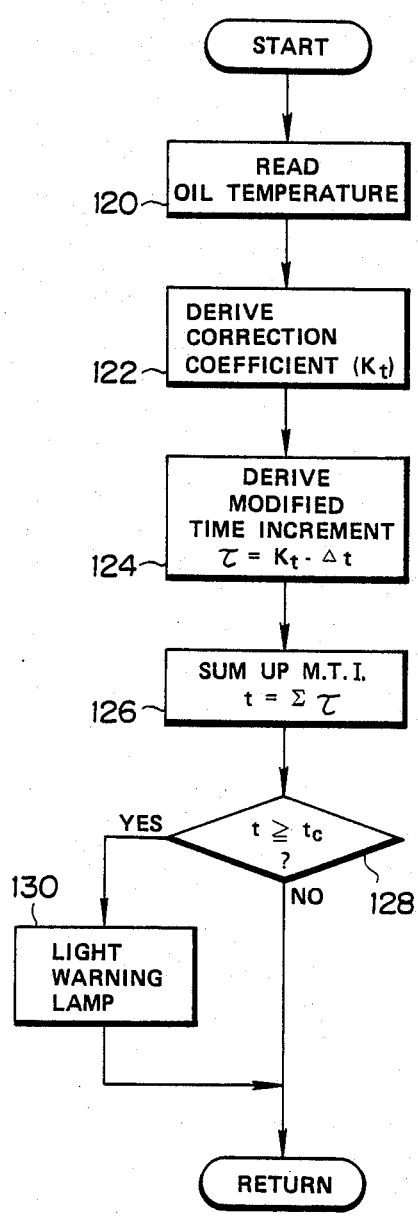

As is seen from the flowchart of FIG. 3, when the engine starts, the oil temperature detected by the temperature sensor 22 is read at step 120.

Then, at step 122, a correction coefficient '$K_t$' is derived from the nature of the oil used. For example, the correction coefficient '$K_t$' is determined larger than 1 when the oil temperature is very high and/or the oil temperature is quite low causing increase of any aqueous foreign matter in the oil.

At step 124, a predetermined time increment '$\Delta t$' is multiplied by the correction coefficient '$K_t$' to derive a modified time increment '$\tau$' which is stored, and at step 126, the value '$\tau$' is integrated or summed up to derive a time dependent oil degration value 't'. At step 118, the value 't' is compared with predetermined value '$t_c$' which represents the need of oil change.

When the value 't' is still smaller than the predetermined value '$t_c$', the above-mentioned steps are repeated. It is now to be noted that regardless of the condition as to whether the engine operates or not, the time dependent oil degradation value 't' is increased continuously with passage of time.

When, at step 128, the updated value 't' becomes equal to or larger than the predetermined value '$t_c$' the warning lamp 10 is energized to light letting a person know the need of the oil change (step 130).

Figure 4:
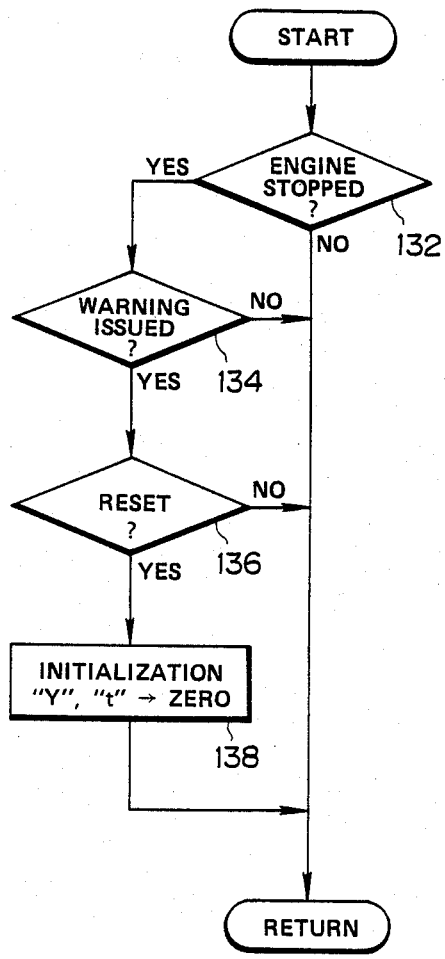

The next-mentioned program is also executed in the present invention which is shown in FIG. 4.

When the warning lamp 10 is energized to light due to maturing of the distance dependent oil degradation value 'Y' and/or the time dependent oil degradation value 't', the engine is stopped, and the oil change is carried out.

The engine stop is executed by turning the ignition switch 26 to 'OFF' position. As is seen from the flowchart, the engine stop is checked at step 132, SO that when the engine is stopped, the matter as to whether the oil change warning has been issued or not is judged from the condition of the warning lamp 10. That is when, upon stop of the engine, the warning lamp 10 is energized to light, it is judged that the oil change warning has been properly issued.

When it is judged at step 134 that the oil change warning has been properly issued, the operation of the reset switch 14 is checked at step 136. When the reset operation of the reset switch 14 is recognized, the distance dependent oil degradation value 'Y' and the time dependent oil degradation value 't' are both initialized to zero at step 138.

As is described hereinabove, in accordance with the present invention, even when the engine is under standstill, the time dependent oil degradation value 't' increases continuously with passage of time, and this value 't' is corrected in accordance with the oil temperature. Thus, unlike the afore-mentioned conventional oil degradation warning system, the system of the present invention can issue the oil change warning at the time when the oil change is really necessary.

Furthermore, in the present invention, for detecting the engine oil temperature, the temperature sensor 20 is mounted to the turbocharger 22 which is highly heated under operation of the engine. This means that the correction coefficient '$K_t$' is determined by taking into a consideration the severe degradation phenomenon of the engine oil which flows through such a highly heated portion. Thus, assured oil change warning is expected.

What is claimed is:

1. An oil degradation waning system for an engine equipped with a turbocharger, comprising:
   first means for detecting the temperature of an engine oil which flows through said turbocharger;
   second means for deriving a correction coefficient from informations issued from said first means;
   third means for multiplying, a predetermined time increment by said correction coefficient thereby to derive a modified time increment;
   fourth means for integrating said modified time increment thereby to derive a time dependent oil degradation value; and
   fifth means for issuing a warning when said time dependent oil degradation value becomes equal to or larger than a predetermined value.

2. An oil degradation warning system as claimed in claim 1, in which said first means is an oil temperature sensor which is mounted to said turbocharger to detect the temperature of the oil which flows along the turbocharger shaft.

3. An oil degradation warning system as claimed in claim 2, in which said fifth means comprises a comparator which compares said time dependent oil degradation value and said predetermined value, and a warning lamp which is energized to light when receiving a given signal from said comparator.

4. An oil degradation warning system as claimed in claim 3, further comprising:
   sixth means for deriving a correction coefficient for the value of the traversed distance from the values of engine speed and engine oil temperature;
   seventh means for multiplying the value of vehicle speed by a predetermined time increment thereby to derive a traversed distance;

eighth means for multiplying the value of the traversed distance by said correction coefficient to derive a modified traversed distance;

ninth means for integration the value of said modified traversed distance to derive a distance dependent oil degradation value; and tenth means for issuing a warning when said distance dependent oil degradation value becomes equal to or larger than a predetermined value.

5. An oil degradation warning system as claimed in claim 4, in which said tenth means comprises a comparator which compares said distance dependent oil degradation value with said predetermined value, and said warning lamp which is energized to light when receiving a given signal from said comparator.

6. An oil degradation warning system as claimed in claim 4, in which said engine speed is detected by an crankangle sensor mounted in a distributor of the engine, and in which said vehicle speed is detected by a sensor which measures the rotation speed of an output shaft of a transmission incorporated with the engine.

* * * * *